(12) United States Patent
Parampottil et al.

(10) Patent No.: US 11,720,556 B1
(45) Date of Patent: Aug. 8, 2023

(54) MANAGEMENT OF RESIDENT TO RESIDENT MAIL BETWEEN CONTROLLED-ENVIRONMENT FACILITIES

(71) Applicant: Securus Technologies, LLC, Carrollton, TX (US)

(72) Inventors: Isaac Parampottil, Coppell, TX (US); Anna Jessica Lentell, Osage Beach, MO (US); Christopher Douglas, McKinney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 37 days.

(21) Appl. No.: 17/119,061

(22) Filed: Dec. 11, 2020

(51) Int. Cl.
*G06F 16/242* (2019.01)
*G06F 16/22* (2019.01)
*G06F 16/28* (2019.01)
*G06Q 10/10* (2023.01)
*G06Q 10/107* (2023.01)

(52) U.S. Cl.
CPC .......... *G06F 16/244* (2019.01); *G06F 16/221* (2019.01); *G06F 16/284* (2019.01); *G06Q 10/107* (2013.01)

(58) Field of Classification Search
CPC .... G06F 16/244; G06F 16/221; G06F 16/284; G06Q 10/107
USPC ....................................................... 707/769
See application file for complete search history.

(56) References Cited

U.S. PATENT DOCUMENTS

| | | | |
|---|---|---|---|
| 8,498,937 B1 * | 7/2013 | Shipman, Jr. | G06Q 20/405 705/41 |
| 9,094,500 B1 * | 7/2015 | Edwards | H04M 3/38 |
| 9,742,935 B1 * | 8/2017 | Shipman, Jr. | G06F 3/1238 |
| 2009/0013359 A1 * | 1/2009 | Butler | H04L 67/10 725/105 |
| 2013/0179949 A1 * | 7/2013 | Shapiro | H04L 63/08 726/4 |
| 2017/0270627 A1 * | 9/2017 | Hodge | G06F 16/24578 |

* cited by examiner

*Primary Examiner* — Kuen S Lu
(74) *Attorney, Agent, or Firm* — Fogarty LLP (57) ABSTRACT

In a controlled-environment facility resident-to-resident communication management system a controlled-environment facility electronic digital mail center, and/or the like, receives and creates a digital version of an original mail item received at a controlled-environment facility, and a controlled-environment facility mail database, and/or the like, that stores digital versions of original mail items received at the controlled-environment facility. A centralized controlled-environment facility investigative data aggregation and analysis platform, and/or the like, identifies a sender and/or sending address of the original mail item from the digital version of the original mail item, queries a database using identification of the sender and/or the sending address, determines whether the sender is a resident of another controlled-environment facility, and in response to a determination that the sender is a resident of another controlled-environment facility, flags the digital version of the original mail item as a controlled-environment facility resident-to-resident communication.

21 Claims, 4 Drawing Sheets

MANAGEMENT OF RESIDENT TO RESIDENT MAIL BETWEEN CONTROLLED-ENVIRONMENT FACILITIES

TECHNICAL FIELD

The present disclosure relates generally to processing of incoming mail to residents of controlled-environment facilities, more particularly to converting such mail to a digital format, and specifically to controlled-environment facility management of resident-to-resident mail between controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world. By allowing prisoners to have some contact with friends and family while incarcerated, the justice system aims to facilitate their transition back into society upon release. Traditional forms of contact include postal mail, telephone calls, in-person visitation, conjugal visits, etc.

Residents of controlled-environment facilities, such as inmates in county, state and federal correctional facilities, are typically permitted to send and receive mail via the postal service and/or commercial mail carriers. The processing of this "snail mail" represents a significant financial and labor burden, as all letters must be inspected for contraband, inappropriate language content and hidden messages. Moreover, the letters must be sorted by individual housing unit and distributed to the individual residents.

Generally, all incoming and outgoing inmate mail is subject to being opened and manually inspected by prison staff. The items that may be received by an inmate via mail vary depending upon the facility, but generally include written correspondence, legal or official documents, postcards or greeting cards, pictures, pamphlets, books, money, such as funds for the inmate's trust account, or the like. To prevent inmates from receiving illegal substances, however, some facilities do not deliver certain types of inbound mail, such as items with gummed or adhesive labels or with non-postal stamps. The list of mail items that are not permitted can be fairly extensive. For example, certain facilities do not allow inmates to receive maps, transportation schedules, stickers, decals, cosmetics, hair care, hygiene items, food, gifts, locks of hair, items sprayed with perfume, ribbons, cigarettes, matches, lighters, dried or pressed flowers, coupons, lottery tickets, compact discs, cassette tapes, bookmarks, postage stamps, stationery, writing or drawing materials, paper clips, gang-related materials, sexually explicit materials, etc. Mail containing such items may be destroyed or disposed of instead of being delivered to the inmate.

The distribution of postal mail to residents of a controlled-environment facility is also an extremely costly and labor-intensive activity. For every piece of postal mail received at the facility, a facility official must look up the resident associated with the correspondence, determine whether the resident is allowed to receive correspondence at all and/or determine whether the resident is allowed to receive the correspondence from the individual who sent it, sort the postal mail for delivery based on resident housing assignment, and then spend hours delivering the postal mail throughout the facility. Since this is a daily activity, it demands substantial facility resources to accomplish the task. Further, postal mail that arrives at a correctional facility via the postal service is often contaminated, such as with a biohazard. The personnel who are responsible for opening, examining, reading and sorting the postal mail are often necessarily equipped with gloves and masks to prevent infection. This aspect of the job affects personnel recruitment and retention.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform such tasks and/or investigations with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a controlled-environment facility resident to controlled-environment facility resident communication management system that employs a controlled-environment facility electronic digital mail center, and/or the like, that receives and creates a digital version of an original mail item received at a controlled-environment facility. The subject controlled-environment facility(y)(ies) may be a prison or jail, and the original mail item may have been sent to an inmate, arrestee, or detainee who is a resident of such a facility. The original mail item may be a document, letter, photograph, or the like. In such cases, the controlled-environment facility electronic digital mail center, and/or the like, is further configured to create the digital version of the original mail item by scanning the original mail item, and/or the like. In cases where the original mail item is, or includes, a memory device, the controlled-environment facility electronic digital mail center, and/or the like, is further configured to create the digital version of the original mail item, such as by copying content stored on the memory device, and/or the like. A controlled-environment facility mail database, and/or the like, stores digital versions of original mail items received at the controlled-environment facility.

A centralized controlled-environment facility investigative data aggregation and analysis platform, and/or the like, which may be serving a plurality of controlled-environment facilities, identifies a sender and/or sending address of the original mail item from the digital version of the original mail item. This identification of the sender may be a name of the sender, a controlled-environment facility resident custody account number of the sender, or the like. The centralized controlled-environment facility investigative data aggregation and analysis platform, and/or the like, may then query a database using identification of the sender and/or the sending address, and determines whether the sender is a resident of another controlled-environment facility.

In response to a determination that the sender is a resident of another controlled-environment facility, the centralized controlled-environment facility investigative data aggregation and analysis platform, and/or the like, flags the digital version of the original mail item as a controlled-environment facility resident-to-resident communication. The centralized controlled-environment facility investigative data aggregation and analysis platform may share the flagging of the digital version of the original mail item as a controlled-environment facility resident-to-resident communication with the controlled-environment facility receiving the original mail item, the other controlled-environment facility that the sender is a resident of, a third party (e.g., an investigator), and/or the like. Also, the centralized controlled-environment facility investigative data aggregation and analysis platform, and/or the like, may display the flagging of the digital version of the original mail item as a controlled-environment facility resident-to-resident communication on a user interface of the platform, and/or the like. Further, the centralized controlled-environment facility investigative data aggregation and analysis platform, and/or the like, may provide an alert of the flagging of the digital version of the original mail item as a controlled-environment facility resident-to-resident communication to personnel of the controlled-environment facility receiving the original mail item, the other controlled-environment facility that the sender is a resident of, a third party (e.g., an investigator), and/or the like.

A controlled-environment facility communication processing system, and/or the like, may provide the digital version of the original mail item for display to a controlled-environment facility resident it is addressed to. In such circumstances, the centralized controlled-environment facility investigative data aggregation and analysis platform, and/or the like, may monitor the controlled-environment facility resident-to-resident communication, further controlled-environment facility resident-to-resident communications between the sender and the controlled-environment facility resident the original mail item is addressed to, and/or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Facilities may scan and digitize postal mail items and provide an electronic copy to the inmates. This may be achieved using a digital mailbox service that provides electronic or digital versions of physical mail items to inmates. The digital version of mail items may be stored and made available to the inmates as well as investigators, law enforcement officers, facility staff, inmates' attorneys, and the like.

The present systems and methods relate generally to processing of incoming mail to residents of controlled-environment facilities, more particularly to converting such mail to a digital format, and specifically to controlled-environment (correctional) facility management of resident (inmate)-to-resident (inmate) mail, between controlled-environment facilities (i.e., mail from a resident (inmate) of one controlled-environment (correctional) facility to a resident (inmate) of another controlled-environment (correctional) facility). Thus, in accordance with embodiments of the present systems and methods, a controlled-environment facility resident to controlled-environment facility resident communication management system employs a controlled-environment facility electronic digital mail center, and/or the like, that receives and creates a digital version of an original mail item received at a controlled-environment facility, and a controlled-environment facility mail database, and/or the like, stores digital versions of original mail items received at the controlled-environment facility. A centralized controlled-environment facility investigative data aggregation and analysis platform, and/or the like, identifies a sender and/or sending address of the original mail item from the digital version of the original mail item, queries a database using identification of the sender and/or the sending address, and determines whether the sender is a resident of another controlled-environment facility. In response to a determination that the sender is a resident of another controlled-environment facility, the centralized controlled-environment facility investigative data aggregation and analysis platform, and/or the like, flags the digital version of the original mail item as a controlled-environment facility resident-to-resident communication.

Typically, management of inmate-to-inmate postal mail is addressed by sending the mail back to the sender. Controlled-environment facilities, such as correctional facilities, may employ embodiments of the present systems and methods to manage and control resident-to-resident, such as inmate-to-inmate, (scanned) postal mail. Embodiments of the present systems and methods manage such inmate-to-inmate (controlled-environment facility resident-to-resident) postal or electronic mail by identifying it and using it for investigative purposes. To wit, embodiments of the present systems and methods may employ a centralized investigative data aggregation and analysis platform as a user interface to present and manage resident-to-resident scanned postal mail. In accordance with embodiments of the present systems and methods, a data "dip" of (i.e., perform a database inquiry with respect to) a mail sender information file may be performed, which may, in accordance with embodiments of the present systems and methods, result in a matchup database dip against all controlled-environment facility residents, such as all controlled-environment facility residents in controlled-environment facilities (e.g., jails and prisons) served by a common vendor, such as a common controlled-environment facility communications vendor, investigations provider, or the like. In some embodiments this dip may be performed against a (publicly available, or law enforcement available) database of inmates of all prisons and jails (in, or under, a particular jurisdiction). If the sender address, name or other identification (such as an inmate identification number, or the like) is found during such a dip, then the mail will be flagged as suspicious activity, specifically a resident-to-resident (inmate-to-inmate) communication. Once flagged, the facilities can share the information based on an investigative sharing relationship between the involved facilities, such as at a "community" level. The involved facilities may, as a result, be enabled to establish covert alerts or other forms of notification to help manage the inmate-to-inmate (resident-to-resident) communication. The centralized investigative data aggregation and analysis platform portal user interface may display the communication between the inmates (residents) as part of the centralized investigative data aggregation and analysis platforms provisioning of investigative leads, such as displaying the resident-to-resident communication as a suspicious activity.

Figure 1:
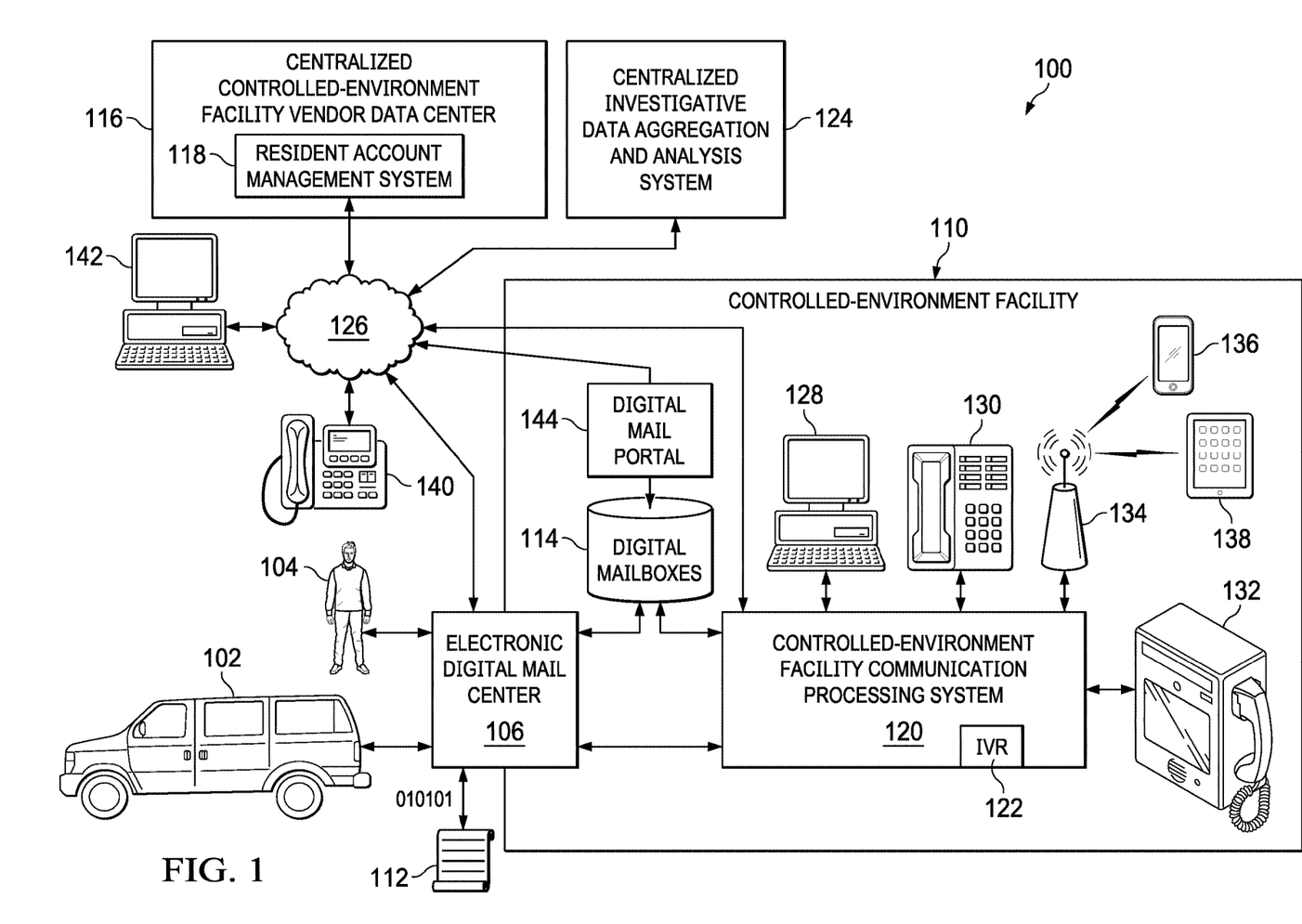
FIG. 1 is a block diagram of an example controlled-environment where a digital mail service and management of resident-to-resident mail between controlled-environment facilities may be employed, according to some embodiments.

FIG. 1 is a block diagram of example controlled-environment 100 where digital mail service and management of resident-to-resident mail between controlled-environment facilities may be employed, according to some embodiments of the present systems and methods. Physical items, such as mail (e.g., letters, or the like) may be delivered by U.S. Postal Service 102, by courier (e.g., UPS, Federal Express, etc.), or in-person 104 to an electronic digital mail center 106 of controlled-environment facility 110. In other embodiments, electronic digital mail center 106 may also receive inbound electronic documents 112, such as electronic messages (email), chats, texts, or a document (e.g. PDF, JPEG, DOCX, XLSX) attached to an email. Electronic digital mail center 106 is coupled to digital mail (mailbox) database 114, controlled-environment facility vendor datacenter 116's resident account management system 118, controlled-environment facility communication processing system 120, which may include or be coupled to interactive voice response (IVR) system 122, and/or centralized investigative data aggregation and analysis system 124, directly, or via a network (126).

Controlled-environment facility communications processing system 120 may provide telephone services, videoconferencing, online chat, and other communication services to residents of controlled-environment facility 110. In some cases, such as illustrated, communications processing system 120 may be co-located with controlled-environment facility 110. Alternatively, or additionally, an external centralized communication processing system may be deployed in a (centralized) controlled-environment facility vendor (e.g. a controlled-environment facility communications provider) datacenter 116, or the like. That is, communications processing system 120 may be centrally and/or remotely located with respect to one or more controlled-environment facilities and/or may provide communication services to multiple controlled-environment facilities, in which case, controlled-environment facility 110 is illustrated as one example. Such a controlled-environment facility vendor datacenter may be connected to such facilities via a public network (e.g. the Internet) or a private network (e.g. intranet) 126, or the like (e.g. via a secure tunneling protocol over the internet, using encapsulation). More generally, however, it should be noted that controlled-environment facility communication processing system 120 may assume a variety of forms, including telephony switches such as electronic switching systems, or the like, and/or and may be configured to serve a variety of facilities and/or users, whether within or outside of a controlled-environment facility. Communication system 120 may be coupled to a variety of communication devices, such as, for example, computer 128, telephone 130, or a communal communication and media terminal 132. Any appropriate network, such as a plain old telephone service (POTS) network, voice over IP (VoIP) network, two-wire telephone network, or digital network, such as the Internet (126), an intranet, or an enterprise network, may be used to connect communication devices 128-132 to controlled-environment facility communication processing system 120. A wireless access point 134 may also be used to connect controlled-environment facility communication processing system 120 to wireless devices, such as smartphone/personal media device 136 or tablet computing device 138. Wireless access point 134 may provide an RF interface (e.g., based on Wi-Fi, Bluetooth, ZigBee, WiMAX, Near-field communication (NFC), or other communication protocols or standards) and may exchange data wirelessly between controlled-environment facility communication processing system 120 and wireless devices 136 and 138.

Communal communication and media terminal 132 may be referred to as an Intelligent Facility Device (IFD) and may be a video phone particularly adapted for use in a controlled-environment facility. IFD 132 may also be used to place voice calls and may take the form of, or be used as, a voice phone that may have a touchscreen interface. Generally speaking, IFD 132 may be located in a visitation room, in a resident pod, as part of a kiosk, etc. Residents may also use a personal computer wireless device, such as smartphone/media player 136 or tablet computing device 138, that is adapted and/or approved for use in a controlled-environment facility. Such a smartphone/media player 136 or tablet computing device 138 may be referred to as an Intelligent Resident Device (IRD) or, in a correctional institution embodiment, as an Intelligent Inmate Device (IID). As will be appreciated, IFD 132, IRD 136, 138, or similar devices, as well as computer 128 and phone 130, etc. have communications capabilities, to enable a party to participate in telephone calls, video visitation sessions (video calls), or the like with other call parties, such as non-residents, under control of controlled-environment facility communication processing system 120.

IFD 132 may be a replacement for typical telephones provided in controlled-environment facilities, such as rehabilitation centers, jails and prisons, utilizing existing facility telephony wiring. While the IFD 132 is generally illustrated in FIG. 1 as hardened, wall-mounted devices, IFD 132 may also take the form of a kiosk-type terminal or the like. In some cases, IFD 132 may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFD 132 may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends.

IRDs 136 and 138 may be adapted and/or approved for use by residents of controlled-environment facility 110. For example, IRDs 136 and 138 may be "stripped-down," particularly from the standpoint of what applications are provided or allowed on the IRD and/or the connectivity afforded to the IRD. By way of example, such an IRD may employ an operating system kernel that has been rebuilt for use in such a tablet computing device in a controlled-environment facility. As a further example, such an IRD may be adapted to only connect to a network (e.g., access point 134) provided by controlled-environment facility 110, and/or in only certain locations, within the controlled-environment facility 110, such as may be controlled by availability of Wi-Fi access. That is, for example, where access may be compartmentalized, leveraging the structure of the controlled-environment facility 110, for example limiting the availability of a Wi-Fi signal providing the stream through the placement of wireless access points 134, antenna directionality of such wireless access points, and/or the like. Also, the IRDs 136 and 138 may have certain fixed applications pre-installed on the device, and installation of further apps on the device may be forbidden (i.e. prevented by modifications to the device's operating system, or the like) and/or restricted, such as by requiring permission from a facility administrator, or the like. Applications provided on IRD 136 and 138 may support services of particular interest to residents of the controlled-environment facility, such as access to a legal research service or access to employment searching services provided to inmates nearing release. Communication services may also be provided by IRDs 136 and 138, such as messaging, electronic mail, calling, and video visitation applications. Similar applications may be provided for residents on IFD 132.

In the context of a correctional facility, residents may use devices 128-138 to access certain communication services. In some facilities, one or more of devices 128-138 may be disposed within a kiosk or other suitable location within controlled-environment facility 110. For example, a resident may initiate telephone services by lifting the receiver on telephone 130 or IFD 132 or selecting a calling application on devices 128, 132-138. The resident may then be prompted to provide a personal identification number (PIN), custody account number, or other identifying information or biometric sample (e.g., thumbprint, voice print, iris scan, etc.). IVR unit 122 may generate and play prompt or other messages to residents on devices 128-138. Under the control of controlled-environment facility communication processing system 120, devices 128-138 may be capable of connecting to a non-resident (e.g., residents' friends, family, attorneys, etc.). For example, a non-resident may use a telephone 140 or computer 142 to access controlled-environment facility communication processing system 120 across a network 144, such as a publicly switched telephone network (PSTN) or packet data network, such as, the Internet. Communication system 120 may include one or more analog switches, digital routers, IP gateways, PBX systems, etc. (not shown) that provide communication capabilities for controlled-environment facility 110. It will be understood that telephone 140 may be any analog or digital telephone device or processor-based device running a telephone application and that computer 142 may be any personal computer, laptop, tablet, smartphone, or other processor-based device.

Communication system 120 may operate to ensure that a resident's telephone calls, video visitations, messaging, texting, chats, etc. are performed only with approved non-residents whose identities, devices, email addresses, phone numbers, etc. are listed in a resident's Pre-Approved Contact (PAC) and/or Pre-Approved Number (PAN) list. Each resident's PAC or PAN list may be stored, for example, in resident account management system 118. In addition to PAC or PAN list(s), resident account management system 118 may also store resident profile data (RPD), such as balances for inmate trust and calling accounts, trial schedule, conviction data, criminal record, sentencing data, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. As described in more detail below, resident account management system 118 may also include incoming and outgoing mail rules applicable to each resident or for groups of residents.

Centralized investigative data aggregation and analysis system 124 may be a centralized platform for providing investigative tools for communications, such as telephone calls, video visitations, and messages, such as electronic mail or texts, to multiple controlled-environment (correctional) facilities and/or law enforcement agencies. Such investigative tools may provide monitoring, collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like.

One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as Communication Detail Records (CDRs)), so that an investigator may research them through an archive and may be provided access to internal and/or external criminal databases and/or other sources of useful information.

In accordance with various embodiments of the present systems and methods centralized investigative data aggregation and analysis system 124 may also facilitate setup of alerts and establishing permissions for sharing of information between controlled-environment facilities (correctional facilities), the centralized investigative data aggregation and analysis system may also facilitate overall issuance of, distribution of, and follow-up to, proactive investigation alerts across multiple controlled-environment facilities (e.g., across a "community" of such controlled-environment facilities).

In operation, electronic digital mail center 106 may receive one or more inbound physical or digital items addressed to a particular resident housed within facility 110 (i.e., the intended recipient of the item). Examples of physical items include, but are not limited to, written correspondence, legal or personal documents, postcards or greeting cards, pictures, pamphlets, books, money, optical discs (e.g., CDs and DVDs), cassette tapes, flash memory devices, three-dimensional objects, etc. Upon receiving a physical or electronic item, electronic digital mail center 106 may create an electronic version or digital representation of the item, which may also be referred to herein as a digital mail item. It will be understood that the mail items may also be received as electronic documents 112 that are already in digital form (e.g., letters input as text). Electronic digital mail center 106 may save such electronic documents 112 as digital mail items, such as by converting the electronic document 112 to a format required for storage in database 114 or by maintain the original format of the electronic document 112 for storage. Electronic digital mail center 106 and digital mailbox database 114 will then process all digital mail items in the same way whether the item was originally received in a physical or electronic format.

For example, when the physical item is a letter, document, or picture, creating the electronic or digital version may include scanning the item into an electronic document format (e.g., PDF, JPEG, GIF, etc.) to create a digital mail item. If the physical item is a CD or DVD, creating the digital version may include copying the contents of the CD or DVD in an audio format (e.g., MP3, WAV, WMA, AIFF, AAC, etc.), video format (H.261, H.263, H.264, M-JPEG, MPEG, DivX, etc.), or another suitable file format. Also, if the physical item is a three-dimensional object, creating the digital version may include taking a digital picture of the object in a still picture format (e.g., JPEG, TIFF, RAW, BMP, GIF, etc.) or another suitable file format to create the digital mail item. In some situations, two or more different electronic representations may be obtained for the same physical item (e.g., a music CD may have its content saved in an MP3 file and the album cover may be scanned into a JPG image). Resulting image files, which may include files such as the aforementioned PDF, JPEG, TIFF, RAW, BMP, GIF, etc. may be subjected to an optical character recognition (OCR) process, or other text input process, the like, as discussed in greater detail below, and which, as also discussed in greater detail below, may be used for searching based on keywords, or the like.

In operation, embodiments of the present systems and methods for digitizing mail items arriving at controlled-environment facility 110 also manage resident-to-resident mail between controlled-environment facilities. To wit, controlled-environment facility electronic digital mail center 106, of the like receives and creates digital versions of original postal mail items, and/or the digital version of original electronic mail items, received at controlled-environment facility 110. These digital versions of original electronic mail items and/or digital versions of original postal mail items received at controlled-environment facility 110 may be stored in controlled-environment facility mail database 114, or the like.

After converting the inbound physical or electronic item into a digital mail item in electronic form (or converting an inbound electronic document 112 to a format required for storage), electronic digital mail center 106 may store the digital version of the inbound item within digital mailboxes database 114. In some cases, electronic digital mail center 106 may cause a physical notification to be delivered (e.g., on paper or verbally through prison staff) to the resident. The notification may advise the resident that a digital mail item has arrived, is ready for delivery, and/or may include instructions on how to access digital mailbox database 114, for example, using one or more of devices 128-138.

However, first, embodiments of the present systems and methods, manage resident-to-resident mail between controlled-environment facilities. That is, in addition to storing digital versions of physical or electronic items in digital mailbox database 114, electronic digital mail center 106 may also enable enforcement of inbound mail restrictions imposed by facility 110 or other authorities. For example, facility 110 may forbid, or monitor communication between residents of controlled-environment facilities, have rules forbidding residents from receiving more than a given amount of correspondence each day, week, or month, etc. In some cases, electronic digital mail center 106 may recognize a violation of the mail volume limitation and return the physical item to the sender. In other cases, however, upon converting a physical item to an electronic representation, electronic digital mail center 106 may store the electronic representation in database 114 and delay notifying the resident until it is determined that a mail volume restriction is not being violated. Examples of inbound mail restriction rules include, but are not limited to, resident-to-resident mail, a maximum number of letters, envelopes or packages, a maximum number of pages or items, a maximum size of an object, a maximum number of objects, a maximum size of the resulting electronic representation (e.g., in kilobytes or megabytes), etc. There may also be inbound mail restrictions with respect to types of mail, such as certified mail, or the like. Some of these different types of restrictions may be associated with a respective time period.

Moreover, electronic digital mail center 106 may be configured to enforce security protocols implemented by facility 110 or other authorities, such as using investigative data aggregation and analysis system 124. For example, upon receiving a letter, electronic digital mail center 106 may perform an OCR operation followed by an automated examination of its contents (e.g., via keyword searching, word or text spotting, etc.). In operation of embodiments of the present systems and methods, centralized controlled-environment facility investigative data aggregation and analysis system or platform 124, or the like, identifies the sender and/or sending address of the original postal mail item or original electronic mail item, from the digital version of the original postal mail item or the digital version of the original electronic mail item.

In some cases, electronic digital mail center 106 may also perform a range of biometric analyses including, but not limited to, handwriting recognition, facial recognition, graphic content recognition, etc. in a similar fashion. In this manner, rather than having the staff manually read all incoming letters, a computer-based algorithm may flag security violations in an automated way. For example, if the physical item is an image or a photograph, image recognition software may be used to flag pornographic or other forbidden materials. In some cases, image recognition routines may be applied to an image or photograph to ensure that a resident does not receive information about certain persons (e.g., crime victims or potential victims), places, objects, etc. Similar security protocols may be applied to inbound electronic documents 112.

In various implementations, in order to enforce mail restrictions and/or security protocols, electronic digital mail center 106 may obtain certain information from resident account management system 118. For example, if an inbound letter identifies a particular sender listed in resident account management system 118 as a gang member, the digital version of the letter may be flagged for review and not be delivered to the resident. In some cases, the information obtained by electronic digital mail center 106 may aid in criminal investigations in and out of facility 110. For example, police or other investigative authorities may request facility 110 to implement notification rules with respect to specific residents (or groups of residents) so that, if the resident receives a certain type of physical or electronic item (or an item sent by a particular person, etc.), investigative data aggregation and analysis system 120 may notify the authorities automatically. In operation of embodiments of the present systems and methods, centralized controlled-environment facility investigative data aggregation and analysis platform or system 124, or the like, dips (i.e., queries) a database using identification of the sender and/or the sending address. For example, such a matchup database dip may be performed against all controlled-environment facility residents, such as all controlled-environment facility residents in controlled-environment facilities (e.g., jails and prisons) served by a common vendor, such as a common controlled-environment facility communications vendor, investigations provider, or the like, in one or more databases maintained at, or in conjunction with controlled-environment facility vendor datacenter 116, or the like. In some embodiments this dip may be performed against a (publicly available, or law enforcement available) database of inmates of all prisons and jails (in, or under, a particular jurisdiction). In accordance with embodiments of the present systems and methods, this identification of the sender used for the dip may be the name of the sender, facility location, facility name, a controlled-environment facility resident PIN or custody account number of the sender, and/or the like. Then the centralized controlled-environment facility investigative data aggregation and analysis platform or system, or the like, may determine whether the sender is a resident (e.g., inmate, arrestee, or detainee) of another controlled-environment (e.g., correctional, jail, etc.) facility. Thusly, digitization techniques may allow investigative authorities to link different residents or identify behavioral patterns that would otherwise go unnoticed by the prison staff. As a further example, an investigator may be able to query digital mailbox database 114 to determine that a same non-resident is mailing physical letters to different residents. The investigator may also query database 114 to determine, for example, that various residents are receiving communications regarding the same or similar topics.

As such, investigators may be empowered to monitor or otherwise intercept communications that may be related to criminal or gang-related activities and more. In operation of embodiments of the present systems and methods, centralized controlled-environment facility investigative data aggregation and analysis platform or system 124, or the like, in response to a determination that the sender is a resident of another controlled-environment facility, flags the digital version of the original postal mail item, or the digital version of the original electronic mail item, as a controlled-environment facility resident to controlled-environment facility resident communication ("resident-to-resident communication") which may include flagging the communication, the sender or the recipient with a "suspicious activity," flag, or the like. Further, if the sending address of the original postal mail item, or the digital version of the original electronic mail item, is another controlled-environment facility, then the centralized controlled-environment facility investigative data aggregation and analysis platform or system, or the like, may, likewise, determine the sender is a resident of that other (i.e., another) controlled-environment facility.

However, certain controlled-environment facility resident-to-resident communications may be allowed. For example, one of the subject inmates/residents may be authorized to communicate with the other inmate/resident, such as if the inmates/residents are a family member, or for some other authorized reason. In such cases, the communication may be processed and sent to the receiving inmate/resident.

In accordance with embodiments of the present systems and methods, centralized controlled-environment facility investigative data aggregation and analysis platform 124 may share flagging of the digital version of the original postal mail item, or the digital version of the original electronic mail item, as a resident-to-resident communication with controlled-environment facility 110, with the other controlled-environment facility that the sender is a resident of (with an indication that the communication is "suspicious activity," or the like), and/or another (third) party, such as an investigator, or the like. This may include sharing a copy of, or a link to, the digital version of the original postal mail item, or the digital version of the original electronic mail item.

Additionally, or alternatively, centralized controlled-environment facility investigative data aggregation and analysis platform 124 may display the resident-to-resident communication on a user interface of the centralized controlled-environment facility investigative data aggregation and analysis platform, flagged as "suspicious activity," or the like, and linked to the digital version of the original postal mail item, or the digital version of the original electronic mail item.

Also, additionally, or alternatively, centralized controlled-environment facility investigative data aggregation and analysis platform 124 may provide an alert of the flagging of the digital version of the original postal mail item, or the digital version of the original electronic mail item, as a resident-to-resident communication to personnel of the controlled-environment facility (110) receiving the original postal mail item, or the original electronic mail item, the other controlled-environment facility that the sender is a resident of, and a third party (e.g., an investigator, etc.). This alert may include a copy of, or a link to, the digital version of the original postal mail item, or the digital version of the original electronic mail item.

After converting the physical or electronic item to its electronic representation and helping enforce mail restrictions and/or security protocols, electronic digital mail center 106 may determine how to handle the physical item. In some cases, the physical item may be sent to a storage facility. For example, the physical item may be tagged with a bar code, radio frequency identification (RFID) module, etc. prior to being sent to storage. The tag may include, for example, the date of receipt of the item, the date that the item was mailed, the type of item, the identity and/or address of the sender, the identity of the addressee (e.g., resident identification number, case number, etc.), or the like.

Electronic digital mail center 106 may then maintain an electronic database of stored physical or electronic items. In various implementations, each entry of such a database may be associated with a copy of the digital version of the corresponding physical or electronic item stored in database 114. In this manner, upon release from facility 110, the resident may retrieve the physical items from storage. Additionally, or alternatively, the physical items may be disposed of according to a retention policy implemented by facility 110. For example, a retention policy may mandate that paper items be shredded a number of days, months, or years after receipt, and that other objects be maintained in storage until the resident's release. In some cases, whether or not a particular physical item has been determined to violate a security protocol may govern its eventual disposition. For instance, in some cases, the physical or electronic item may be used as evidence in criminal proceedings.

As noted, electronic digital mail center 106 may also notify the resident that a digital mail item has arrived for him or her via controlled-environment facility communication processing system 120. In some implementations, when residents attempt to use one of devices 128-138 to initiate a call or remote visitation, controlled-environment facility communication processing system 120 and/or electronic digital mail center 106 may play an audio or video message or cue that a digital mail item is ready for delivery. The resident may then access his or her digital mailbox in database 114 and review its contents. For example, the resident may enter voice commands or DMFT tones via devices 130 or 132 in response to an audio menu presented by IVR 122. Additionally, or alternatively, controlled-environment facility communication processing system 120 and/or electronic digital mail center 106 may serve a web-based version (e.g., website, webpage, Internet or intranet portal, etc.) of the resident's digital mailbox to devices 128 or 132-138, for example.

Thus, in operation of various embodiments of the present systems and methods, controlled-environment facility communication processing system 120, or the like may provide the digital version of the original physical or electronic item for display to a controlled-environment facility resident it is addressed to, such as on controlled-environment facility computer 128, communal controlled-environment facility resident communication and media terminal 132, controlled-environment facility resident smartphone/personal media device 136, controlled-environment facility resident tablet computing device 138, or the like. In accordance with such embodiments of the present systems and methods, centralized controlled-environment facility investigative data aggregation and analysis platform 124, or the like may not only monitor any (initial) resident-to-resident communication, but also, monitor any further (subsequent) resident-to-resident communications between the sender and the controlled-environment facility resident that the original physical or electronic item is addressed to.

However, as noted, certain controlled-environment facility resident-to-resident communications may be allowed, such as where, the inmates/residents are a family member, or for some other authorized reason one of the subject inmates/residents is authorized to communicate with the other inmate/resident. In such cases, the communication may be processed and sent to the receiving inmate/resident. In some embodiments, electronic digital mail center 106 may perform similar operations upon at least a portion of the outbound mail—i.e., physical or electronic items sent by a resident of facility 110 to a non-resident of that facility. For example, if a resident writes a letter to a family member whose e-mail address, phone number, or other contact information is known (e.g., stored in resident account management system 118, etc.), then electronic digital mail center 106 may convert the physical item to an electronic format (e.g., OCR, text-to-speech, etc.) and deliver the digital version of the item (e.g., by e-mail, telephone, FAX, etc.) rather than (or in addition to) delivering the item itself. In these cases, facility 110 may have outbound restrictions and/or security protocols that may be different from their inbound counterparts, but that nonetheless may be implemented by electronic digital mail center 106.

When converting an outbound physical letter or document to electronic form or when formatting an inbound electronic document 112 for storage, electronic digital mail center 106 may add one or more electronic or digital signatures to the resulting electronic representation of the document. In some embodiments, two distinct signatures or certificates may be added to the electronic representation. A first digital signature may be added on behalf of the resident to certify that the resident wrote or signed the document, and a second signature may be added certifying that the prison processed the original physical document. In this manner, the resident may be able to conduct certain types of business from within controlled-environment facility 110.

Although shown as located at controlled-environment facility 110, it will be understood that electronic digital mail center 106, controlled-environment facility communication processing system 120, and/or investigative data aggregation and analysis system 124 may be local to facility 110 or at a location that is remote from facility 110, as illustrated. Electronic digital mail center 106 may be located at least partially within controlled-environment facility 110. In other embodiments, however, electronic digital mail center 106 may be remotely located with respect to facility 110, such as at controlled-environment facility vendor datacenter 116, and connected to controlled-environment facility communication processing system 120 via the Internet or other network. In some cases, a single electronic digital mail center 106 may serve two or more facilities 100. In other cases, a single facility 110 may be served by two or more electronic post offices 103. In some implementations, electronic digital mail center 106 may interact with one or more resident account management system 118 directly or via a computer network, such as the Internet. Alternatively, electronic digital mail center 106 may be incorporated into resident account management system 118 or vice-versa. Accordingly, in some cases, an RDP database may be combined with digital mailbox database 114 (and/or the database of stored physical or electronic items), and electronic digital mail center 106 and/or resident account management system 118 may enforce inbound/outbound mail restrictions and/or security protocols.

Non-residents, including former residents, may remotely access documents in digital mailbox database 114. For example, a non-resident may use computer 142 to connect to digital mailbox database 114 via network 126. A digital mail portal 144 may be associated with a publicly accessible domain that the non-resident connects to using a web browser, for example. The digital mail portal 144 acts as an external gateway to digital mailbox database 114 and prompts the non-resident to enter the appropriate credentials in order to access digital mailbox database 114. Unless approved credentials are provided, the non-resident will be prevented from accessing digital mailbox database 114. Remote access credentials may be managed, for example, by resident account management system 118. Remote access to digital mailbox database 114 may be monitored by investigative data aggregation and analysis system 124, for example, to ensure only authorized users are allowed access and to monitor the types of items being accessed and/or to prevent access to restricted or unauthorized content.

In some embodiments, digital mail items may need to be provided directly to non-residents. For example, where facility 110 is a prison or jail, digital mail items may be relevant to a legal proceeding, such as potential trial exhibits or in response to a subpoena or other legal document request. In such cases, printed hard copies or a CD with electronic copies of digital mail items may be provided to a non-resident, such as a resident's attorney, prosecutor's office, law enforcement agency, investigator, or the like. If such documents are later used at a trial, hearing, or administrative proceeding, there may be a need to prove that the document presented is an accurate and unaltered copy of the original physical document that was scanned by the electronic digital mail center 106.

In one embodiment, a unique identifier is assigned to every new digital mail item as it is created from received physical or electronic mail. A unique identifier may be created, for example, for each page of a letter or document, for each photograph, picture, or image, or for each email, chat, text, or other item that is received. The unique identifier may be used as the file name of the digital mail item and/or may be appended to the data comprising the digital mail item, such as by embedding the unique identifier as a header or as metadata in an electronic image file (e.g., the JPG, PDF, or other file format used for the digital mail items).

Figure 2:
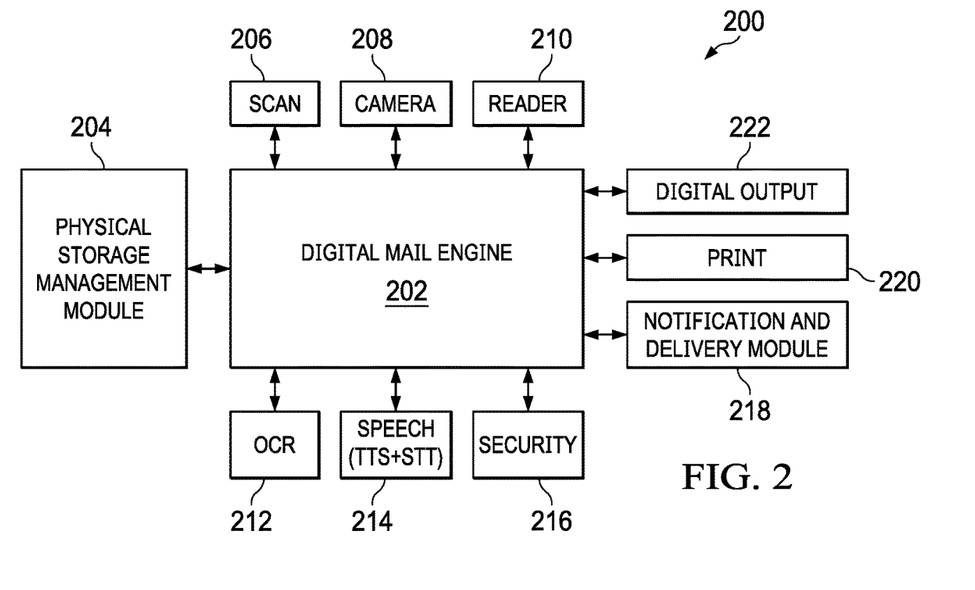
FIG. 2 is a block diagram of a digital mailbox system, according to some embodiments.

FIG. 2 is a block diagram of a digital mailbox system 200. In various embodiments, such a digital mailbox system 200 may be implemented, at least in part, by electronic digital mail center 106. Digital mail engine 202 is coupled to physical storage management module 204, scanning module 206, camera module 208, reader module 210, OCR module 212, speech module 214, security module 216, notification and delivery module 218, printing module 220, and digital output module 222.

As illustrated, digital mail engine 202 may manage the process of converting a physical or electronic item, such as a document or image, to a corresponding electronic representation and storing that representation in digital mailbox database 114 of FIG. 1. Digital mail engine 202 may also manage the receipt, conversion/reformatting, and storage of inbound electronic documents 112. Physical storage management module 204 may be configured to manage the digitization of physical mail items and to store the digital version of mail items. Management module 204 may create a unique identifier, or the like, for each document or image. Scanning module 206 may be configured to operate an optical scanner and process paper items, for example, where the paper item includes writings in visible or invisible ink. Camera 208 may be configured to create a digital image of a physical item (e.g., a three-dimensional object), and reader 210 may be configured to operate an optical disc drive, flash memory reader, etc.

OCR module 212 may be configured to perform an OCR or handwriting recognition operation upon an image obtained via scanning module 206, camera module 208, and/or reader 210 to covert that image to searchable text, such as may be used in accordance with embodiments of the present systems and methods to identify a sender, a sender's controlled-environment facility, or the like. In addition to recognizing text, OCR module 212 may also recognize the language used, and automatically translate the resulting text into a different language (e.g., Spanish to English, etc.). In some cases, OCR module 212, scanning module 206, and printer 220 may be configured to translate Braille to another spoken language and vice-versa. Speech module 214 may be configured to perform text-to-speech (TTS) and/or speech-to-text (STT) operations upon certain types of digital representations of a physical or electronic item.

Physical storage management module 210 may be configured to maintain a database of physical items stored in a particular location or warehouse, inside or outside of facility 110. Module 210 may also be used to generate instructions as to which items need to be retrieved from storage prior to a resident's release, as well as to enforce the facility's item retention policies. Security module 216 may be configured to implement inbound/outbound mail restrictions and/or security protocols. For example, security module 216 may be configured to perform keyword searches upon a digital representation of a physical or electronic item (e.g., an OCR'd version of a letter, a text version of an audio file, etc.) and to flag offensive content. Notification and delivery module 218 may be configured to notify residents and/or staff within facility 110 that an item has arrived, and to deliver the digital version of the item upon the resident or staff's request. For instance, the electronic representation may be delivered to one or more of devices 128-138 shown in FIG. 1. In various embodiments, modules 202-222 shown in FIG. 2 may represent sets of software routines, logic functions, and/or data structures that are configured to perform operations described herein.

Printing module 220 may operate a printer, for example, to produce paper notifications to residents and/or prison staff and to create copies of digital mail items for non-residents. When printing module 220 prints a copy of a scanned document or image. Digital output module 222 may be, for example, an application configured to save electronic files to disk using a CD burner or to a thumb drive using a USB port.

Although modules 202-222 are shown as distinct logical blocks, in other embodiments at least some of the functionality provided by these modules may be combined into fewer blocks. Conversely, one or more of modules 202-222 may be implemented such that it is divided among two or more logical blocks. Moreover, although shown with a particular configuration, in other embodiments these various modules may be rearranged in other ways.

Figure 3:
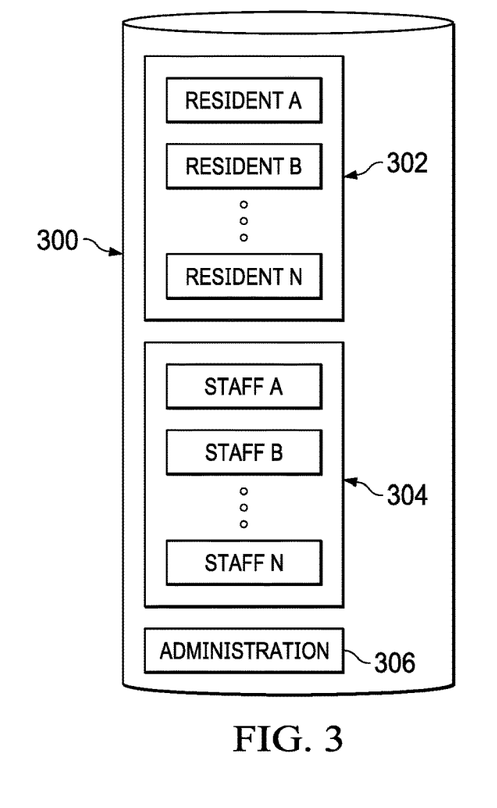
FIG. 3 is a diagram of a digital mailbox database, according to some embodiments.

FIG. 3 is a diagram of a digital mailbox database 300 according to some embodiments. In various implementations, digital mailbox database 300 may be created and maintained by digital mail engine 202 of electronic digital mail center 106. As illustrated, database 300 may include resident records 302, staff records 304, and/or administration records 306. Each of these records may represent digital versions of physical or electronic items received for a specific resident, staff, or administration personnel, respectively. A digital mailbox for each individual resident may include, for each electronic record, fields comprising, for example, a unique identifier, an identification of the sender (e.g., by name, social security number, driver's license number, etc.), a physical address or P.O. box, a date when the item was mailed, a type of delivery (e.g., USPS, UPS, Federal Express, in-person, etc.), date/time of delivery, a type/size of envelope or package, a description of the item (e.g., letter, legal document, etc.), a number of pages or items, a language in which the document is in, etc. The record may also include or otherwise be linked to the electronic documents (e.g., image, audio, video, text, etc.). Additional fields in each record may include text extracted from the document or letter, speech-to-text results, etc.

In some cases, the size of the digital mailbox allocated to each individual resident may be limited as per the prison's mail restrictions, and the resident may be allowed to purchase extra space, for example, using funds from his or her trust account, calling account, etc. For instance, prior to reaching the maximum storage limit for his or her digital mailbox, the resident may be notified of that and may be given the option to purchase additional space and/or delete some of the previously received electronic documents.

Generally speaking, database 300 may include any suitable type of application or data structure that may be configured as a persistent data repository. For example, database 300 may be configured as a relational database that includes one or more tables of columns and rows and that may be searched or queried according to a query language, such SQL or the like. Alternatively, database 114 may be configured as a structured data store that includes records formatted according to a markup language, such as XML, or the like. In other embodiments, database 114 may be implemented using one or more arbitrarily or minimally structured files managed and accessible through a corresponding type of application.

Figure 4:
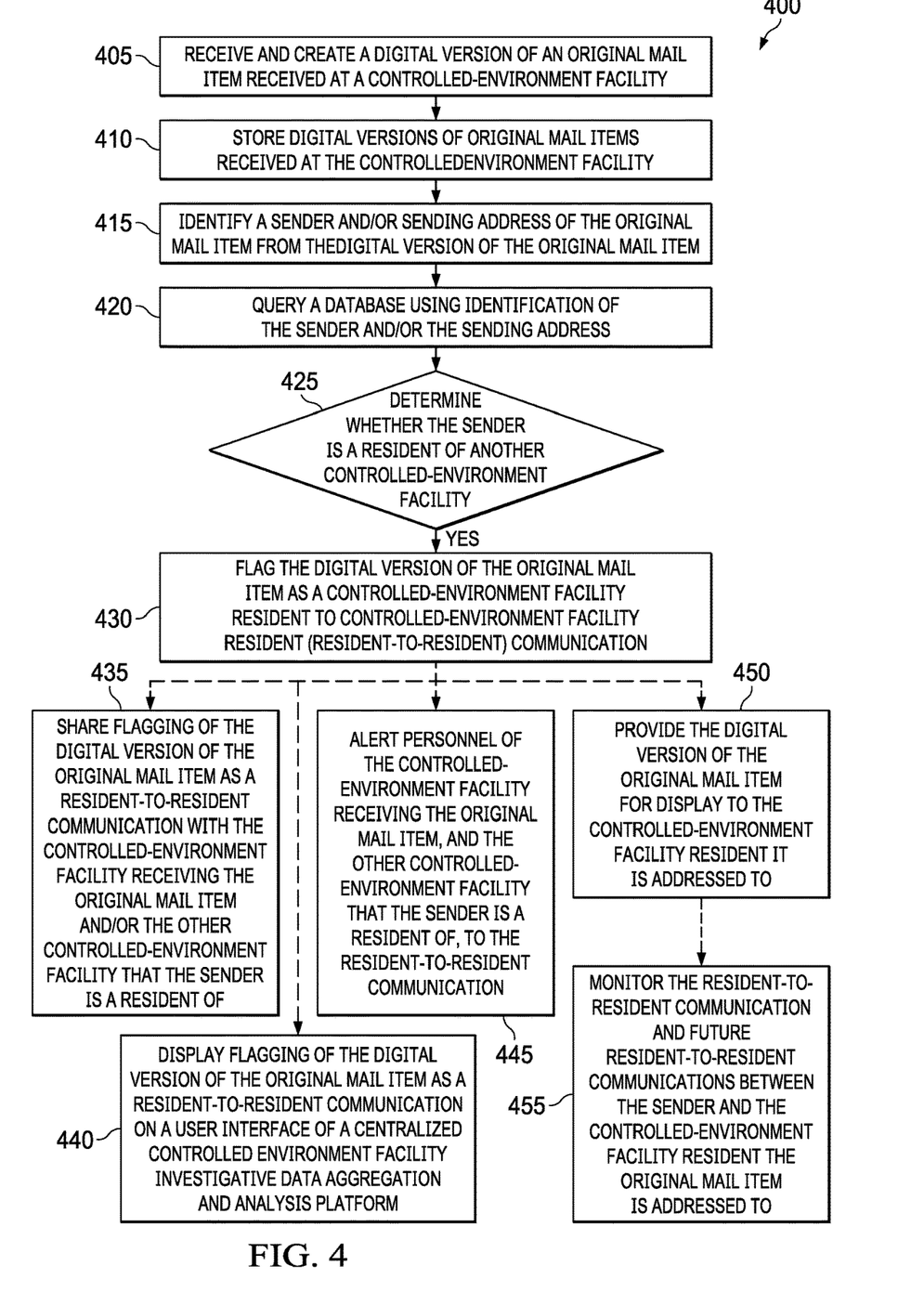
FIG. 4 is a flowchart of an example method for digitizing mail items arriving at a controlled-environment facility and managing resident-to-resident mail between controlled-environment facilities, in accordance with some embodiments.

FIG. 4 is a flowchart of example method 400 for digitizing mail items arriving at a controlled-environment facility (110) and managing resident-to-resident mail between controlled-environment facilities, in accordance with some embodiments. Therein, at 405 a controlled-environment facility electronic digital mail center (106), of the like, receives, and creates a digital version of, an original postal mail item, or a digital version of an original electronic mail item, received at the (first) controlled-environment facility. Such an original postal mail item may be a document, letter, or photograph, and the controlled-environment facility electronic digital mail center may create the digital version of the original postal mail item by scanning the original postal mail item. Where the original postal mail item comprises a memory device (e.g., memory stick, CD, DVD, or the like), the controlled-environment facility electronic digital mail center may create the digital version of the original postal mail item by copying content stored on this memory device. At 410, digital versions of original electronic mail items, and/or digital versions of original postal mail items, received at the controlled-environment facility are stored in a controlled-environment facility mail database (114), or the like.

At 415, a centralized controlled-environment facility investigative data aggregation and analysis platform or system (124), or the like, identifies the sender and/or sending address of the original postal mail item, or original electronic mail items, from the digital version of the original postal mail item, or the digital version of the original electronic mail item. At 420, centralized controlled-environment facility investigative data aggregation and analysis platform or system (124), or the like, queries (i.e., dips) a database using identification of the sender and/or the sending address, and at 425, determines whether the sender is a resident (e.g., inmate, arrestee, or detainee) of another (i.e., a second) controlled-environment (e.g., correctional, jail, etc.) facility. In accordance with embodiments of the present systems and methods, this identification of the sender used for the dip may be the name of the sender, a custody account number or controlled-environment facility resident PIN of the sender, and/or the like. Further, if the sending address of the original postal mail item, or the digital version of the original electronic mail item, is another (a second) controlled-environment facility, then the determination at 425 may be that the sender is a resident of that other (i.e., another) controlled-environment facility. In response to a determination at 425 that the sender is a resident of another controlled-environment facility, the centralized controlled-environment facility investigative data aggregation and analysis platform or system (124), or the like, flags the digital version of the original postal mail item, or the digital version of the original electronic mail item, as a controlled-environment facility resident to controlled-environment facility resident communication ("resident-to-resident communication"), at 430, which may include flagging the communication, the sender, and/or the recipient, with a "suspicious activity," flag, or the like. The flagging may be in the form of, or may be accompanied by, an alert, such as a text, email, notification in or by an application for investigators or the like. The centralized controlled-environment facility investigative data aggregation and analysis platform (124) may also notify the sending facility, or another third party (e.g., an investigator, etc.) that inbound mail has been received from that facility. For example, the centralized controlled-environment facility investigative data aggregation and analysis platform may, at 435, "share" this flagging of the digital version of the original postal mail item, or the digital version of the original electronic mail item, as a resident-to-resident communication, with the controlled-environment facility receiving the original postal mail item, or the digital version of the original electronic mail item, with the other controlled-environment facility that the sender is a resident of, and/or with another (third) party, such as an investigator, or the like (with an indication that the communication is "suspicious activity," or the like). This may include sharing a copy of, or a link to, the digital version of the original postal mail item, or the digital version of the original electronic mail item. Additionally, or alternatively, the centralized controlled-environment facility investigative data aggregation and analysis platform (124) may, at 440, display (an indication of) the resident-to-resident communication on a user interface of the centralized controlled-environment facility investigative data aggregation and analysis platform, flagged as "suspicious activity," or the like, and link to the digital version of the original postal mail item, or the digital version of the original electronic mail item. Still further, the centralized controlled-environment facility investigative data aggregation and analysis platform (124) may, additionally, or alternatively, provide an alert of the flagging of the digital version of the original postal mail item as a resident-to-resident communication, at 445, to personnel of the controlled-environment facility receiving the original postal mail item, the other controlled-environment facility that the sender is a resident of, and/or a third party (e.g., an investigator, etc.). This alert may include a copy of, or a link to, the digital version of the original postal mail item, or the digital version of the original electronic mail item.

In accordance with various embodiments of the present systems and methods, a controlled-environment facility communication processing system (120), or the like may, at 450, provide the digital version of the original physical or electronic item for display to a controlled-environment facility resident it is addressed to, such as on a controlled-environment facility computer (128), a communal controlled-environment facility resident communication and media terminal (132), a controlled-environment facility resident smartphone/personal media device (136), a controlled-environment facility resident tablet computing device (138), or the like. In accordance with such embodiments of the present systems and methods, the centralized controlled-environment facility investigative data aggregation and analysis platform (124), or the like may monitor not only the (initial) resident-to-resident communication discussed above, but also, at 455, monitor any further resident-to-resident communications between the sender and the controlled-environment facility resident the original physical or electronic item is addressed to.

However, as noted, in accordance with some embodiments of the present systems and methods, an (a specific) resident-to-resident (inmate-to-inmate) communication may be allowed, in such instances, the communication is allowed to go through, but may be marked as "allowed resident-to-resident communication," "allowed inmate-to-inmate communication," or the like.

Various elements of the present controlled-environment facility resident contact tools for intelligent controlled-environment facility resident communication and/or media device interfaces may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Figure 5:
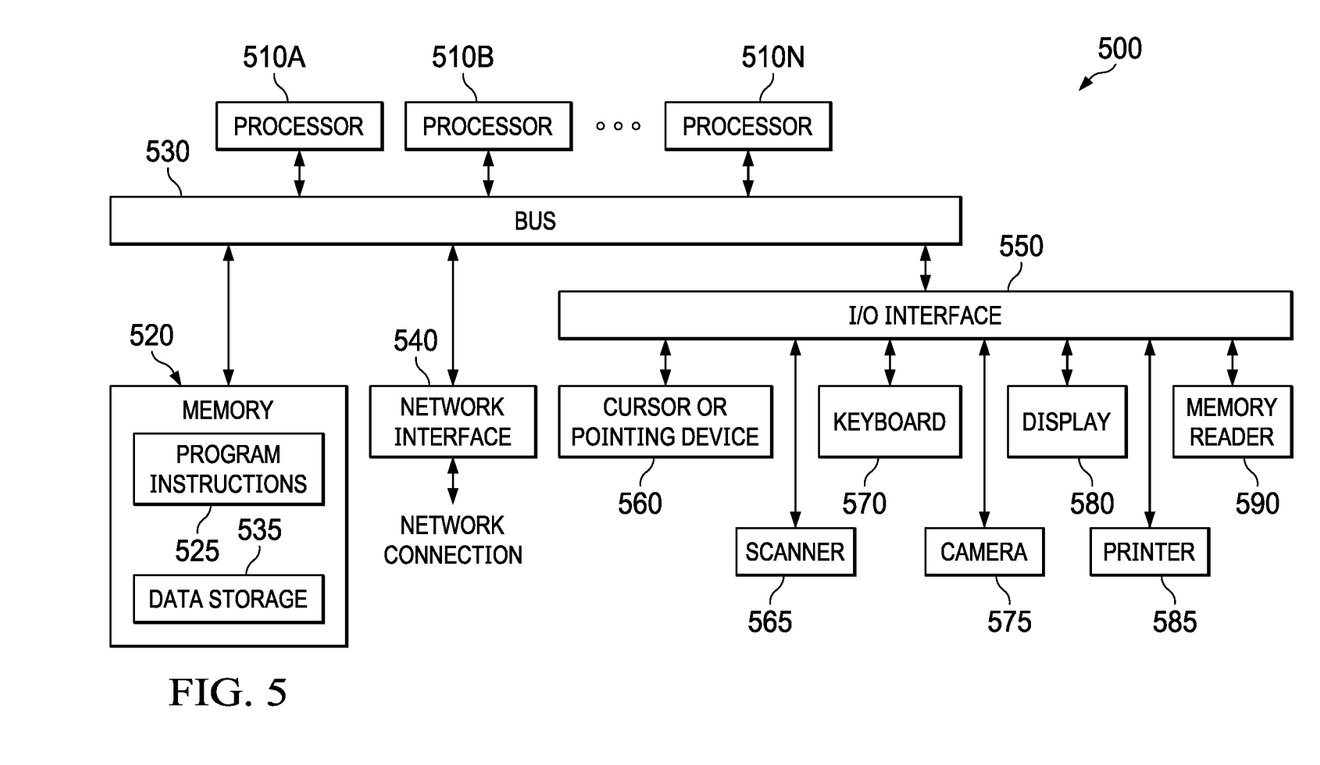
FIG. 5 is a block diagram of a computer system, device, station, or terminal configured to implement various techniques disclosed herein, according to some embodiments.

Embodiments of systems and methods for controlled-environment facility management of resident-to-resident mail between controlled-environment facilities, as described herein, may be implemented or executed by one or more computer systems. One such computer system is illustrated in FIG. 5. In various embodiments, computer system 500 may be a server, a mainframe computer system, a workstation, a network computer, a desktop computer, a laptop, or the like. For example, in some cases, computer system 500 may be used as part of electronic digital mail center 106 shown in FIG. 1 may be implemented as. Moreover, computer system 500 may be used as part of one or more of controlled-environment facility communication processing system 120, IVR 122, resident account management system 118, centralized controlled-environment facility investigative data aggregation and analysis system 124, devices 128-138, and/or the like. As explained above, in different embodiments these various computer systems may be configured to communicate with each other in any suitable way, such as, for example, via a local area network (LAN), a wide area network (WAN), or the Internet.

As illustrated, computer system 500 includes one or more processors 510 coupled to a system memory 520 via an bus 530. Computer system 500 further includes a network interface 540 coupled to bus 530, and one or more input/output devices, such as via input/output interface 550, such as cursor control device 560, scanner 565, keyboard 570, camera 575, display(s) 580, printer 585, and memory reader 590. In some embodiments, a given entity (e.g., electronic digital mail center 106) may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements (e.g., a first computer system may implement digital mail engine 202 while another computer system may implement physical storage management module 204 of electronic digital mail center 106).

In various embodiments, computer system 500 may be a single-processor system including one processor 510, or a multi-processor system including two or more processors 510 (e.g., two, four, eight, or another suitable number). Each of processors 510 may be any processor capable of executing program instructions. For example, in various embodiments, processors 510 may be general-purpose or embedded processors implementing any of a variety of instruction set architectures (ISAs), such as the x88, PowerPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 1-7, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-readable storage medium may include any tangible storage media or memory media such as magnetic or optical media—e.g., disk or CD/DVD-ROM coupled to computer system 500 via bus 530, for example, via memory reader 590 (e.g., an optical disc drive, a Flash reader, etc.). Program instructions and data stored on a tangible computer-readable storage medium in non-transitory form may then further be transmitted by transmission media or signals such as electrical, electromagnetic, or digital signals, which may be conveyed via a communication medium such as a network and/or a wireless link, such as may be implemented via network interface 540.

In an embodiment, bus 530 may be configured to coordinate I/O traffic between processor 510, system memory 520, and any peripheral devices, including network interface 540 or other peripheral interfaces, such as input/output interface 550. In some embodiments, bus 530 may perform any necessary protocol, timing or other data transformations to convert data signals from one component (e.g., system memory 520) into a format suitable for use by another component (e.g., processor 510). In some embodiments, bus 530 may include support for devices attached through various types of peripheral buses, such as a variant of the Peripheral Component Interconnect (PCI) bus standard or the Universal Serial Bus (USB) standard, for example. In some embodiments, the function of bus 530 may be split into two or more separate components, such as a north bridge and a south bridge, for example. In addition, in some embodiments some or all of the functionality of bus 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, printers, cameras, voice or optical recognition devices, or any other devices suitable for entering or retrieving data by one or more computer system 500. Multiple input/output devices may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 5, memory 520 may include program instructions 525, configured to implement certain embodiments described herein, and data storage 535, comprising various data accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments. For example, in some cases data storage 535 may include digital mailbox database 114. In other embodiments, other or different software elements and/or data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various operations described herein, particularly in connection with FIGS. 1 through 5, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident to controlled-environment facility resident communication management system, comprising:
   a controlled-environment facility electronic digital mail center configured to receive and create a digital version of an original mail item received at a first controlled-environment facility;
   a controlled-environment facility mail database configured to store digital versions of original mail items received at the first controlled-environment facility;
   a controlled-environment facility centralized investigative data aggregation and analysis platform configured to:
      identify a sender and/or sending address of the original mail item from the digital version of the original mail item;
      query a database using identification of the sender and/or the sending address to determine whether the sender of the original mail item is a resident of a second controlled-environment facility; and
      flag the digital version of the original mail item as a controlled-environment facility resident to controlled-environment facility resident communication, in response to a determination that the sender of the original mail item is the resident of the second controlled-environment facility.

2. The system of claim 1, wherein the identification of the sender is a name of the sender and/or a controlled-environment facility resident custody account number of the sender.

3. The system of claim 1, wherein the original mail item comprises a document, letter, or photograph, and wherein the controlled-environment facility electronic digital mail center is further configured to create the digital version of the original mail item by scanning the original mail item.

4. The system of claim 1, wherein the original mail item comprises a memory device, and wherein the controlled-environment facility electronic digital mail center is further configured to create the digital version of the original mail item by copying content stored on the memory device.

5. The system of claim 1, wherein the controlled-environment facility centralized investigative data aggregation and analysis platform is further configured to share the flagging of the digital version of the original mail item as a controlled-environment facility resident to controlled-environment facility resident communication with at least one of the first controlled-environment facility the second controlled-environment facility that the sender is a resident of, and a third party.

6. The system of claim 1, wherein the controlled-environment facility centralized investigative data aggregation and analysis platform is further configured to display the flagging of the digital version of the original mail item as a controlled-environment facility resident to controlled-environment facility resident communication on a user interface of the controlled-environment facility centralized facility investigative data aggregation and analysis platform.

7. The system of claim 1, wherein the controlled-environment facility centralized investigative data aggregation and analysis platform is further configured to provide an alert of the flagging of the digital version of the original mail item as a controlled-environment facility resident to controlled-environment facility resident communication to personnel of at least one of the first controlled-environment facility, the second controlled-environment facility that the sender is a resident of, and a third party.

8. The system of claim 1, further comprising a controlled-environment facility communication processing system configured to provide the digital version of the original mail item for display to a controlled-environment facility resident it is addressed to.

9. The system of claim 8, wherein the controlled-environment facility centralized investigative data aggregation and analysis platform is further configured to monitor the controlled-environment facility resident to controlled-environment facility resident communication and further controlled-environment facility resident to controlled-environment facility resident communications between the sender and the controlled-environment facility resident the original mail item is addressed to.

10. The method of claim 1, wherein the controlled-environment facility is a prison or jail, and wherein the original mail item has been sent to an inmate, arrestee, or detainee who is a resident of the facility.

11. A method for management of resident-to-resident mail between controlled-environment facilities, comprising:
    creating a digital version of an original mail item received at a first controlled-environment facility;
    identifying a sender and/or sending address of the original mail item from the digital version of the original mail item;
    querying a database using identification of the sender and/or the sending address to determine whether the sender of the original mail item is a resident of a second controlled-environment facility; and
    flagging the digital version of the original mail item as a controlled-environment facility resident to controlled-environment facility resident communication, in response to the query determining that the sender of the original mail item is the resident of the second controlled-environment facility.

12. The method of claim 11, wherein the identification of the sender is a name of the sender and/or a controlled-environment facility resident custody account number of the sender.

13. The method of claim 11, wherein the original mail item comprises a document, letter, or photograph, and wherein the digital version of the original mail item is created by scanning the original mail item.

14. The method of claim 11, wherein the original mail item comprises a memory device, and wherein the digital version of the original mail item comprises copying content stored on the memory device.

15. The method of claim 11 wherein at least identifying the sender of the original mail item from the digital version of the original mail item, querying the database using identification of the sender, determining whether the sender is a resident of the second controlled-environment facility, and flagging the digital version of the original mail item as the controlled-environment facility resident to controlled-environment facility resident communication is carried out by a controlled-environment facility centralized investigative data aggregation and analysis platform serving a plurality of controlled-environment facilities.

16. The method of claim 15, wherein the controlled-environment facility centralized investigative data aggregation and analysis platform shares the flagging of the digital version of the original mail item as a controlled-environment facility resident to controlled-environment facility resident communication with at least one of the controlled-environment facility receiving the original mail, the second controlled-environment facility that the sender is a resident of, and a third party.

17. The method of claim 15, wherein the controlled-environment facility centralized investigative data aggregation and analysis platform displays the flagging of the digital version of the original mail item as a controlled-environment facility resident to controlled-environment facility resident communication on a user interface of the controlled-environment facility centralized investigative data aggregation and analysis platform.

18. The method of claim 11, further comprising providing an alert of the flagging of the digital version of the original mail item as a controlled-environment facility resident to controlled-environment facility resident communication to personnel of at least one of the first controlled-environment facility receiving the original mail, the second controlled-environment facility that the sender is a resident of, and a third party.

19. The method of claim 11, further comprising providing the digital version of the original mail item for display to a controlled-environment facility resident it is addressed to.

20. The method of claim 19, further comprising monitoring the controlled-environment facility resident to controlled-environment facility resident communication and further controlled-environment facility resident to controlled-environment facility resident communications between the sender and the controlled-environment facility resident the original mail item is addressed to.

21. The method of claim 11, wherein the controlled-environment facility is a prison or jail, and wherein the original mail item has been sent to an inmate, arrestee, or detainee who is a resident of the facility.

\* \* \* \* \*